US008671798B2

(12) United States Patent
Kwon (10) Patent No.: US 8,671,798 B2
(45) Date of Patent: Mar. 18, 2014

(54) COMPRESSION RING FOR AN ISOLATOR IN A MOTION TRANSMITTING REMOTE CONTROL ASSEMBLY

(75) Inventor: Young Dae Kwon, CheonAn (KR)

(73) Assignee: Infac Corporation, Chungcheongnam-Do (KR)

( * ) Notice: Subject to any disclaimer, the term of this patent is extended or adjusted under 35 U.S.C. 154(b) by 1015 days.

(21) Appl. No.: 12/486,448

(22) Filed: Jun. 17, 2009

(65) Prior Publication Data

US 2009/0314123 A1 Dec. 24, 2009

Related U.S. Application Data

(60) Provisional application No. 61/073,572, filed on Jun. 18, 2008.

(51) Int. Cl.
*F16C 1/26* (2006.01)

(52) U.S. Cl.
USPC ..................................................... 74/502.4

(58) Field of Classification Search
USPC .......... 74/500.5, 501.6, 502.4, 502.6; 403/203
IPC .................................................. F16C 1/22,1/26
See application file for complete search history.

(56) References Cited

U.S. PATENT DOCUMENTS

| | | | | |
|---|---|---|---|---|
| 4,263,998 A | * | 4/1981 | Moriya | 192/110 R |
| 4,726,251 A | | 2/1988 | Niskanen | |
| 5,383,377 A | | 1/1995 | Boike | |
| 5,448,926 A | * | 9/1995 | Reasoner | 74/500.5 |
| RE36,722 E | | 6/2000 | Reasoner | |
| 6,148,689 A | | 11/2000 | Uneme | |
| 6,189,408 B1 | | 2/2001 | Scheidling et al. | |
| 6,499,909 B1 | * | 12/2002 | Scheidling et al. | 403/351 |
| 2003/0089189 A1 | * | 5/2003 | Tchoi | 74/502.4 |
| 2006/0053943 A1 | * | 3/2006 | Motonaga et al. | 74/502.4 |
| 2009/0019964 A1 | | 1/2009 | Kwon | |

FOREIGN PATENT DOCUMENTS

| | | | | | |
|---|---|---|---|---|---|
| EP | 348834 A1 | * | 1/1990 | | F16C 1/10 |
| EP | 359353 A1 | * | 3/1990 | | F16C 1/26 |
| EP | 627570 A1 | * | 12/1994 | | F16C 1/26 |
| JP | 07208443 A | * | 8/1995 | | F16C 1/26 |
| JP | 2006275095 A | * | 10/2006 | | F16C 1/26 |
| KR | 2002226031 | | 3/2001 | | |

* cited by examiner

*Primary Examiner* — Thomas Diaz (74) *Attorney, Agent, or Firm* — Dickinson Wright PLLC (57) ABSTRACT

An annular isolator (68, 70) is disposed in an open ended bore (66) of a support body (58) and surrounds an end fitting (26, 28) for attenuating vibrations therebetween. A cap (74) is disposed on the support body (58) to close the open ended bore (66). An inflexible compression ring (76) is sandwiched axially between the isolator (68, 70) and the cap (74) and in abutting engagement with a stop (78) to limit compression of the isolator (68, 70) from the cap (74). The compression ring (76) is inserted into the bore (66) prior to molding the cap (74) to limit compression of the isolator (68, 70) during fabrication.

14 Claims, 8 Drawing Sheets

COMPRESSION RING FOR AN ISOLATOR IN A MOTION TRANSMITTING REMOTE CONTROL ASSEMBLY

CROSS REFERENCE TO RELATED APPLICATION

This application claims the benefit of provisional application Ser. No. 61/073,572 filed Jun. 18, 2008.

BACKGROUND OF THE INVENTION

1. Field of the Invention

The subject invention relates to a motion transmitting remote control assembly of the type for transmitting motion in a curved path by a flexible core element movably supported in a conduit.

2. Description of the Prior Art

The motion transmitting remote control assemblies to which the subject invention pertains are assemblies typically used for positioning of transmission shift members in automobiles, throttle controls, hood latches, and the like. These assemblies include a conduit extending along an axis and a flexible motion transmitting core element movably supported by the conduit. The core element is adapted at one end to be attached to a member to be controlled (such as an automobile transmission), and at another end to a manual actuator (such as a transmission shift lever).

One such motion transmitting remote control assembly is disclosed in the Korean Registration No. 20-0226031 wherein an end fitting extends along an axis for surrounding and supporting the conduit. A support body extends along the axis and presents an open ended bore surrounding and in radial spaced relationship to the end fitting. An annular isolator is disposed in the bore and engages the end fitting and the support body for attenuating vibrations therebetween. A cap is disposed on the support body to close the open ended bore.

Another such prior art assembly is disclosed in applicant's prior U.S. Publication Application 2009/0019964, now U.S. Pat. No. 7,597,027, assigned to the assignee of the present invention. This patent also discloses an end fitting extending along an axis for surrounding and supporting the conduit. A support body extends along the axis and presents an open ended bore surrounding and in radial spaced relationship to the end fitting. An annular isolator is disposed in the bore and engages the end fitting and the support body for attenuating vibrations therebetween. A cap is disposed on the support body to close the open ended bore.

Additionally, it is common in the manufacturing of a motion transmitting remote control assembly to utilize an injection molding process to form one or more components of the assembly. One such example is disclosed in U.S. Pat. No. 6,148,689 to Uneme wherein the entire support body is molded about the annular isolator. However, as the disclosure indicates, the injection molding process can have a negative impact on the performance of the annular isolator as a result of the compression forces being placed upon the annular isolator as the molded component is formed. In addition, the shrinkage of the component following the molding process can also lead to additional compression forces being placed upon the annular isolator. As a result, the '689 Patent attempts to reduce these compression forces through utilization of a specific resin composition during the molding process. However, this process is limited to a small range of resin compositions and thus requires strict manufacturing tolerances.

SUMMARY OF THE INVENTION

The invention provides for an inflexible compression ring sandwiched axially between the isolator and the cap to limit compression of the isolator from the cap. The invention also provides for a method of fabricating a motion transmitting remote control assembly by inserting an inflexible compression ring into the open ended bore prior to molding the cap to limit compression of the isolator.

ADVANTAGES OF THE INVENTION

One advantage of the invention is that it improves the fabrication process by allowing for wider tolerances in molding pressures. In addition, the quality of the motion transmitting remote control assembly is improved by the reduction of compression forces on the isolator. In other words, the compression forces between the isolator and the cap can be controlled to maintain the vibration absorption properties of the isolator. Additionally, control of the compression forces facilitates relative rotational movement between the components or elements of the assembly in a more precise range of torque.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a motion transmitting remote control assembly is generally indicated at 20. The assembly 20 includes a flexible motion transmitting core element 22 for transmitting motion in a curved path. A conduit 24 extends along an axis A and movably supports the core element 22. The conduit 24 is of the known type used in motion transmitting remote control assemblies 20 including an inner tubular member of organic polymeric material surrounded by a plurality of long lay wires disposed on a long lead and encased in an outer jacket of organic polymeric material.

An end fitting 26, 28 extends along the axis A for surrounding and supporting the conduit 24 and includes an end connector 26 and a swivel coupling body 28 for supporting a swivel tube 30. The end connector 26 includes an elongated tubular portion 32 which engages the conduit 24 and is secured thereto. A narrow end portion 34 of the connector is axially shorter than the elongated tubular portion 32 and has a narrower diameter than the elongated tubular portion 32. A shoulder 36 is disposed axially between the elongated tubular portion 32 and the narrow end portion 34. An annular channel 38 extends circumferentially about the narrow end portion 34 of the connector.

The swivel coupling body 28 has a tubular shape and extends along the axis A between a first end 40 and a second end 42. A flange 44 extends radially about the swivel coupling body 28 to a rim 46 and is spaced axially between the first and second ends 40, 42 to define a first pocket 48 on the first end 40 side of the flange 44 and a second pocket 50 on the second end 42 side of the flange 44. The swivel coupling body 28 surrounds the end connector 26 between the first end 40 and the flange 44 and presents a ridge 52 extending radially into the annular channel 38 of the narrow end portion 34 of the end connector 26 for securing the end connector 26 to the swivel coupling body 28. The swivel coupling body 28 presents a spherical pocket 54 between the second end 42 and the flange 44 for receiving the swivel tube 30. The swivel tube 30 surrounds the core element 22 and has a spherical end 56 supported in the spherical pocket 54 for swiveling movement of the swivel tube 30 relative to the swivel coupling body 28.

A support body 58 extends along the axis A between a connecting end 60 and a swivel end 62 and presents an outer axial surface 64 and an open ended bore 66 extending into the connecting end 60 of the support body 58. The open ended bore 66 is disposed radially inwardly from the outer axial surface 64 and the bore 66 surrounds and is in radial spaced relationship to the coupling body 28 and the rim 46. An annular isolator 68, 70 is disposed in the bore 66 and engages the first and second pockets 48, 50 of the support body 58 and the bore 66 for attenuating vibrations therebetween.

A plurality of tabs 72 extend radially outwardly from the outer axial surface 64 of the connecting end 60 of the support body 58, and a cap 74 is disposed in mechanical interlocking engagement with the tabs 72 to close the open ended bore 66. Mechanical interlocking engagement is attained by molding the cap 74 about the support body 58 to interlock with the tabs 72 to prevent axial removal of the cap 74. The molding of the cap 74 results in compression forces being placed upon the annular isolator 68, 70 as the cap 74 is formed, as by injection molding.

As shown in FIGS. 1-3 and FIGS. 8-10, to counteract the molding pressure the assembly 20 is characterized by sandwiching an inflexible compression ring 76 axially between the annular isolator 68, 70 and the cap 74 to limit compression of the isolator 68, 70 during molding and from the cap 74. The term inflexible is used to describe a compression ring 76 which is composed of a material that is capable of withstanding the compression forces of the cap 74. One such example is a compression ring 76 composed of metal. The support body 58 defines a mechanical stop 78 for limiting axial movement of the compression ring 76 to isolate compression of the isolator 68, 70 from the cap 74.

In the preferred arrangement of the assembly 20, the bore 66 in the connecting end 60 of the support body 58 is counterbored 80 to define the mechanical stop 78 extending radially outwardly from the bore 66. As a result, the inflexible compression ring 76 is sandwiched axially between the annular isolator 68, 70 and the counterbore 80. The inflexible compression ring 76 includes an axially extending collar portion 82 in abutting engagement with the stop 78 and extending from the stop 78 axially along the counterbore 80. In addition, the ring 76 includes a conical portion 84 extending conically from the collar portion 82 and a lip portion 86 extending axially from the conical portion 84 for engaging the annular isolator 68, 70. The cap 74 includes a tubular section 88 engaging the tabs 72 and an end section 90 axially engaging the conical portion 84 and a neck section 92 engaging the lip portion 86 of the compression ring 76 for axially engaging the compression ring 76 to limit compression of the isolator 68, 70 from the cap 74.

In the preferred arrangement of the assembly 20, the annular isolator 68, 70 includes a first annular isolator 68 and a second annular isolator 70. In this arrangement, the first annular isolator 68 is disposed about the first pocket 48 and the second annular isolator 70 is disposed about the second pocket 50. Therefore, the inflexible compression ring 76 is sandwiched axially between the first isolator 68 and the counterbore 80 to limit compression of the first isolator 68. In addition, the isolators 68, 70 have different configurations for attenuating different ranges of vibrations.

The configuration of the first annular isolator 68 includes a first cylindrical portion 94 extending axially between the flange 44 and the first end 40 of the swivel coupling body 28. The first cylindrical portion 94 presents a first inner surface 96 engaging the first pocket 48 of the swivel coupling body 28. The first isolator 68 extends radially outwardly from the first cylindrical portion 94 to present a first outer surface 98 engaging the bore 66, and includes a first annular projection 100 extending axially and sandwiched between the bore 66 and the rim 46 of the flange 44. As a result, the first isolator 68 isolates the coupling body 28 from direct contact with the support body 58 to attenuate vibrations therebetween. The first isolator 68 also defines a first annular groove 102 axially facing the first end 40 side of the flange 44 and a first circumferential recess 104 extending radially into the first outer surface 98 and disposed axially between the connector end of the support body 58 and the flange 44 for attenuating vibrations. With regard to the compression ring 76, the conical portion 84 of the ring 76 engages the first isolator 68 and the lip portion 86 of the ring 76 engages the first cylindrical portion 94 to limit compression of the first isolator 68.

The configuration of the second annular isolator 70 includes a second cylindrical portion 106 extending axially between the flange 44 and the second end 42 of the swivel coupling body 28. The second cylindrical portion 106 presents a second inner surface 108 engaging the second pocket 50 of the swivel coupling body 28. The second isolator 70 extends radially outwardly from the second cylindrical portion 106 to present a second outer surface 110 engaging the bore 66 for isolating the coupling body 28 from direct contact with the support body 58 and attenuating vibrations therebetween.

Referring to FIGS. 1-3 and FIGS. 6-7, the configuration of the second isolator 70 further includes a web portion 112 projecting radially from the second cylindrical portion 106 and extending axially shorter than the second cylindrical portion 106. A top portion 114 projects radially from the web portion 112 to the second outer surface 110 and extends axially longer than the web portion 112. The top portion 114 is compressed axially between the flange 44 and the support body 58. The second outer surface 110 of the second isolator 70 includes a rib 116 projecting radially from and beyond the top portion 114 and contacting the bore 66 of the support body 58 for spacing the top portion 114 radially from the bore 66.

Figure 6:
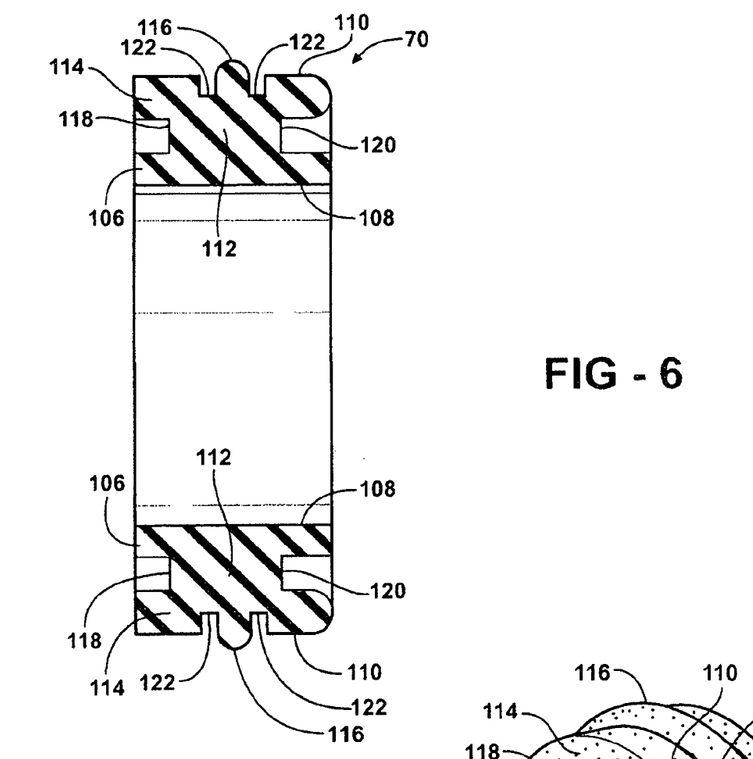
FIG. 6 is a cross-sectional view of the preferred configuration of a second isolator.
Figure 7:
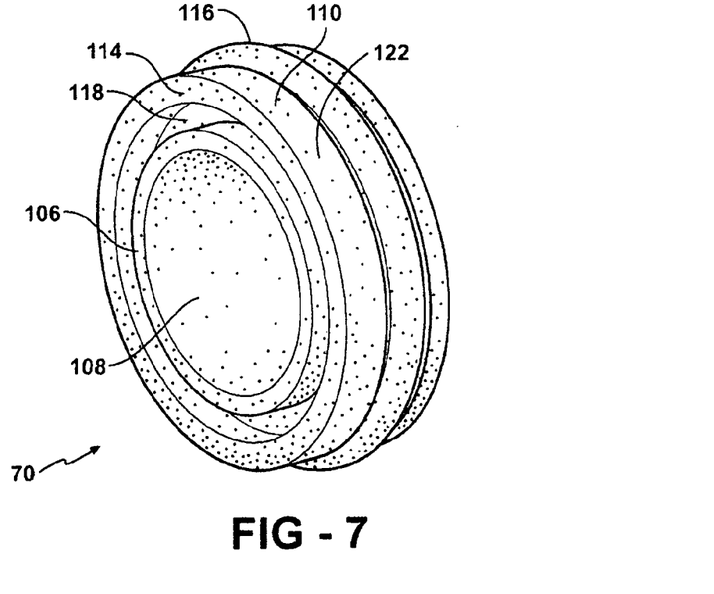
FIG. 7 is a perspective view of the preferred configuration of the second isolator.

The second isolator 70 also defines a second annular groove 118 disposed radially between the top portion 114 and the second cylindrical portion 106 and axially facing the second end 42 side of the flange 44, and a third annular groove 120 disposed radially between the top portion 114 and the second cylindrical portion 106 and axially facing the swivel end 62 of the support body 58. The second isolator 70 includes a pair of annular recesses 122 extending radially into the second outer surface 110 and axially disposed on opposite sides of the rib 116.

Figure 8:
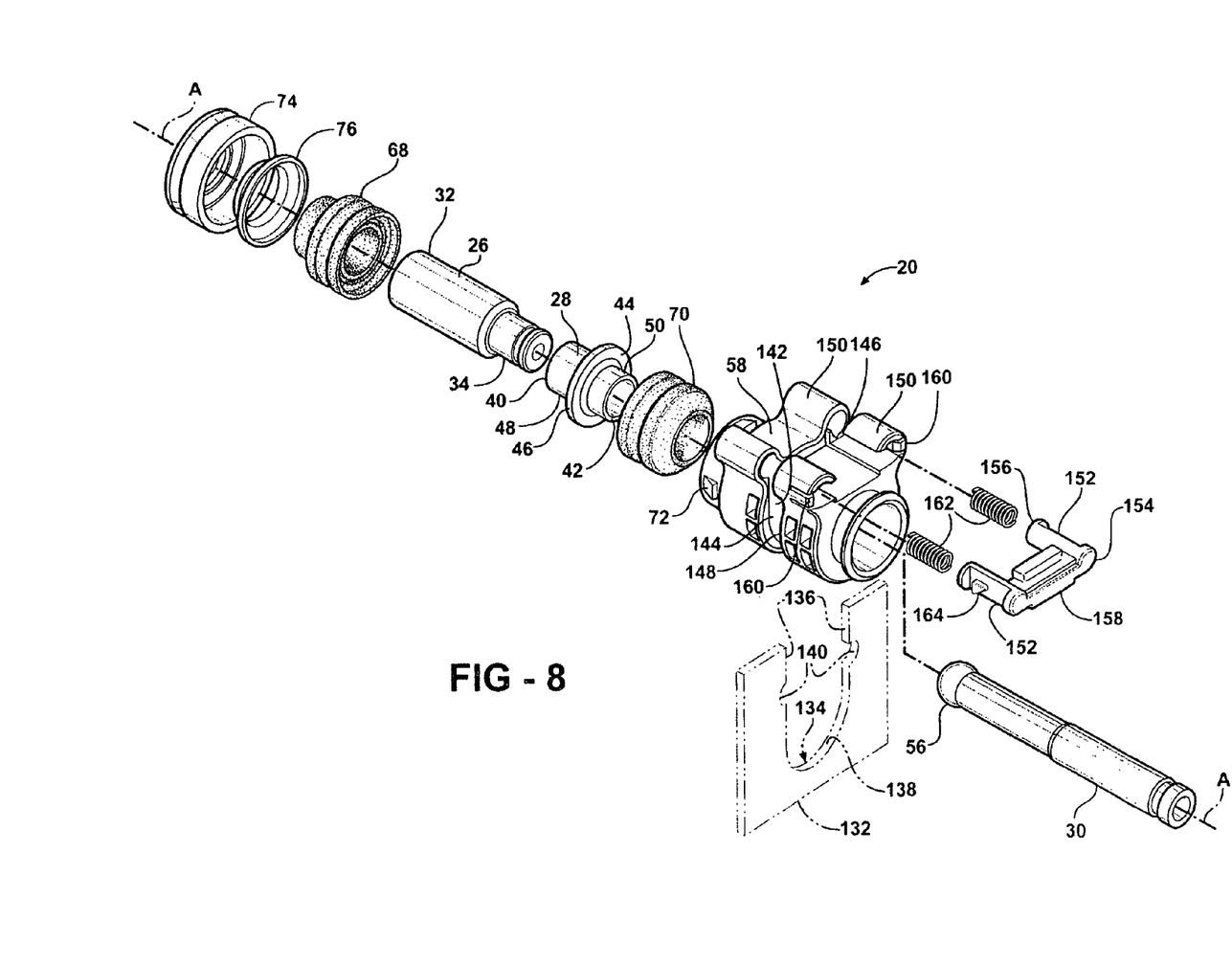
FIG. 8 is an exploded perspective view of a secondary arrangement of a motion transmitting remote control assembly showing a different combination of isolators.
Figure 9:
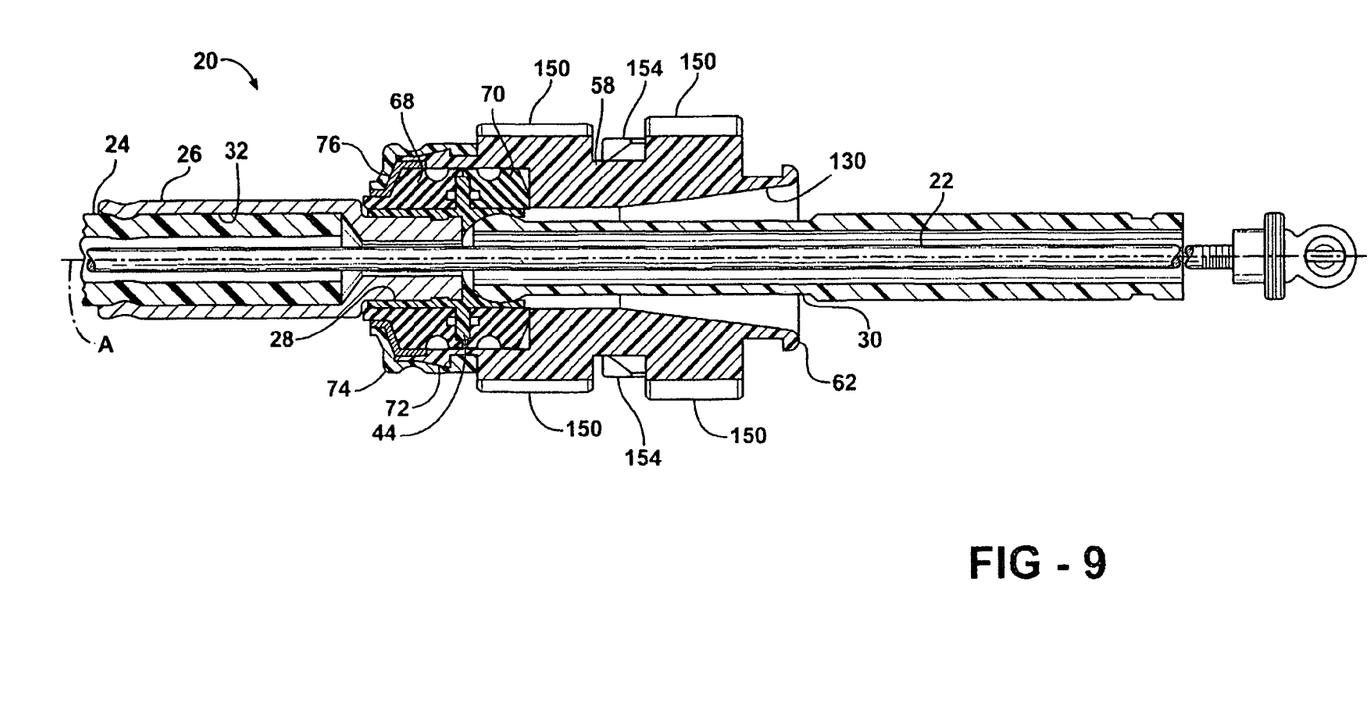
FIG. 9 is a horizontal cross-sectional view of the secondary arrangement of a motion transmitting remote control assembly looking upwardly along the center axis of FIG. 8.
Figure 10:
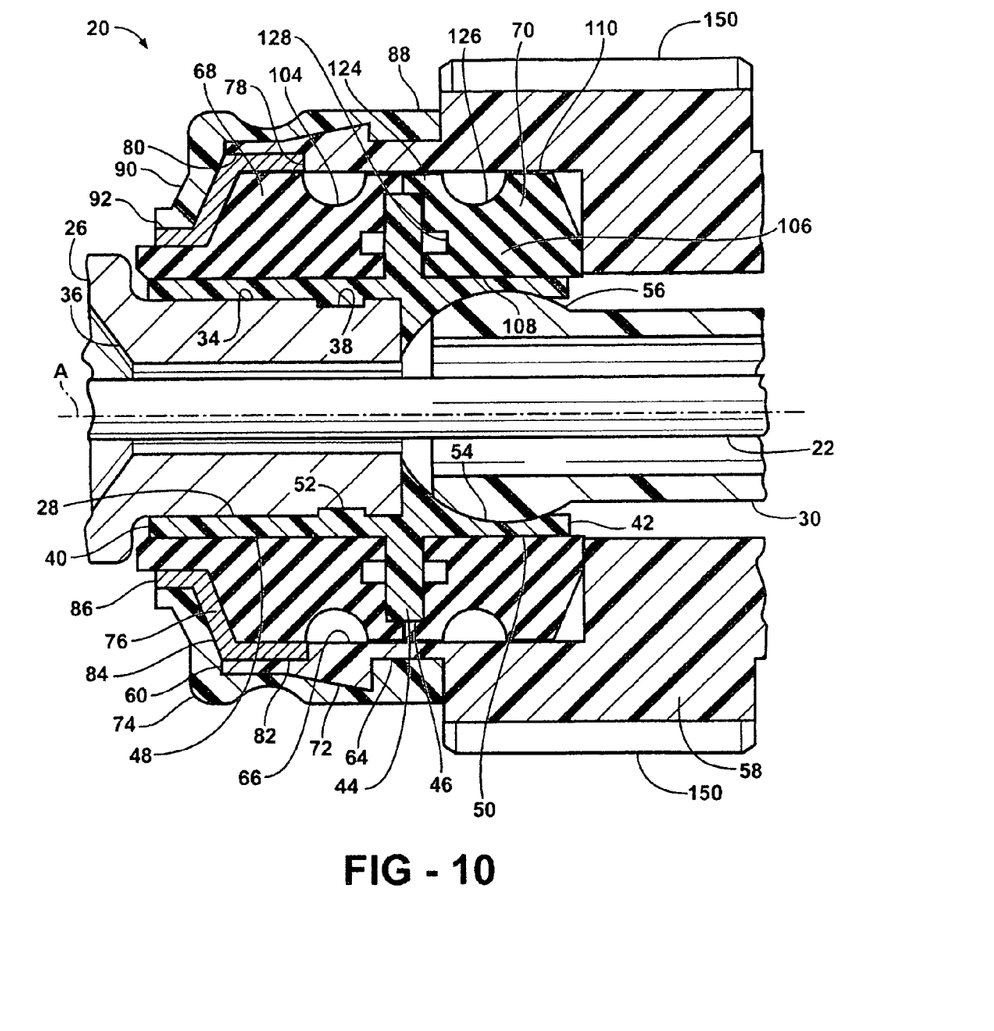
FIG. 10 is an enlarged fragmentary cross-sectional view of the central portion of FIG. 9.

Referring to FIGS. 8-10, a different configuration of the second isolator 70 further includes a second annular projection 124 extending axially and sandwiched between the bore 66 and the rim 46 of the flange 44 for isolating the coupling body 28 from direct contact with the support body 58. The second isolator 70 also defines a second circumferential recess 126 extending radially into the second outer surface 110, and a fourth annular groove 128 axially facing the second end 42 side of the flange 44 for attenuating vibrations.

The motion transmitting remote control assembly 20 further includes the support body 58 presenting a frustoconical inner wall 130 extending axially into the support body 58 from the swivel end 62 and surrounding the swivel tube 30 adjacent the swivel end 62.

Figure 1:
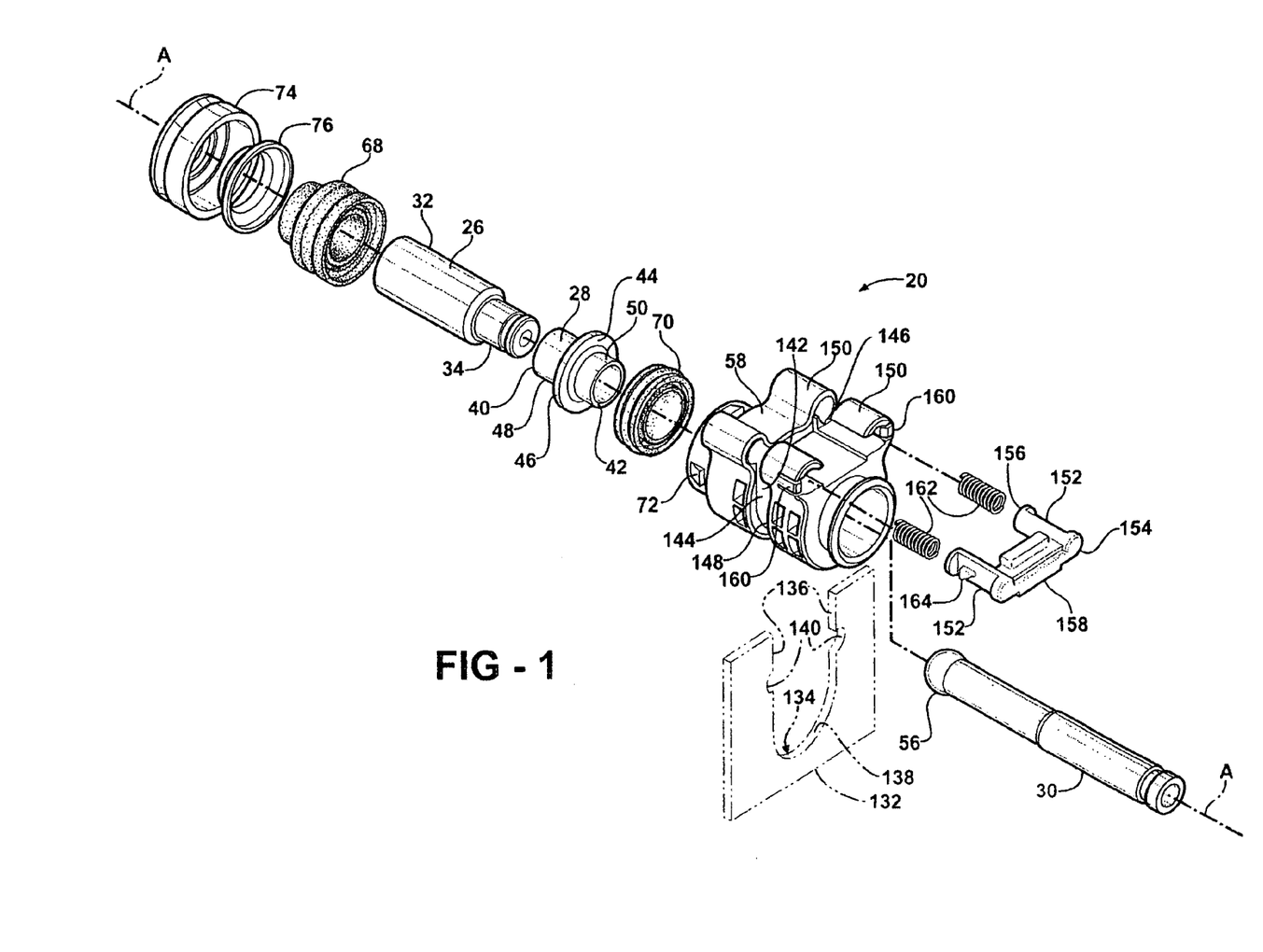
FIG. 1 is an exploded perspective view of a preferred arrangement of a motion transmitting remote control assembly showing an inflexible compression ring disposed axially between a first isolator and a cap.
Figure 2:
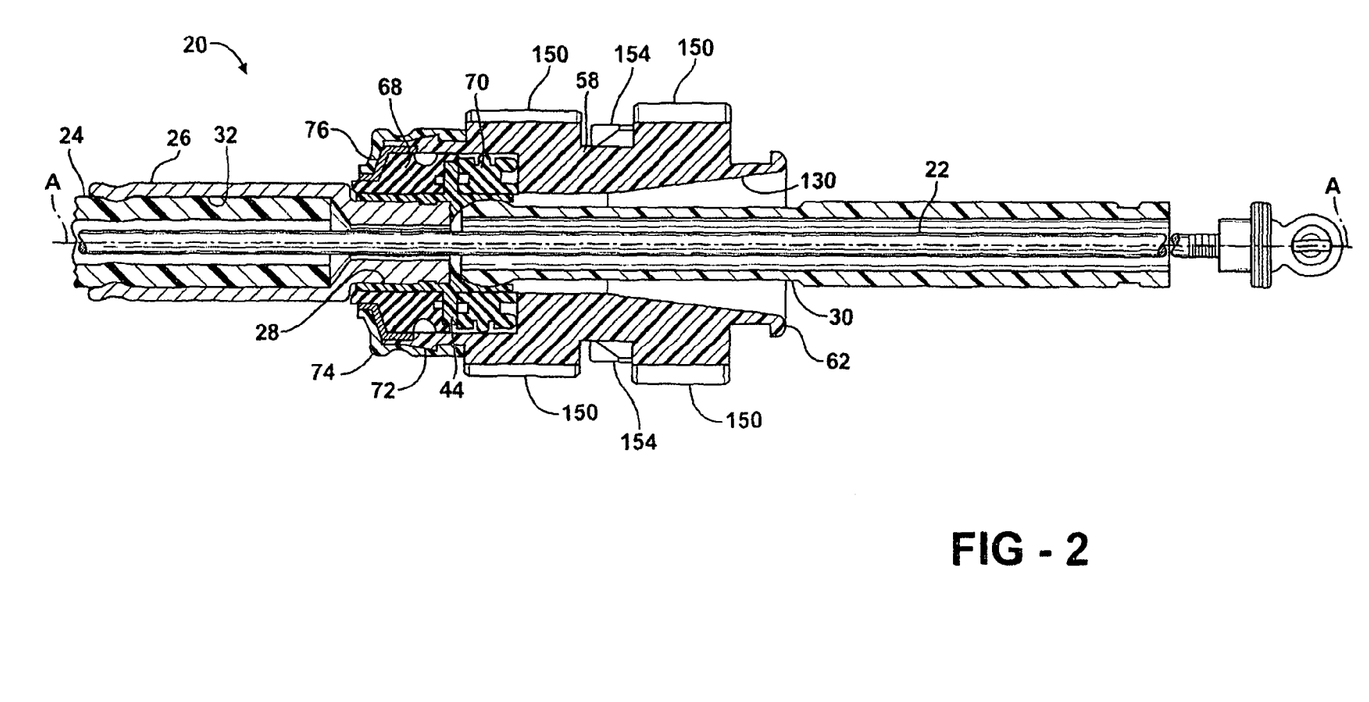
FIG. 2 is a horizontal cross-sectional view of the preferred arrangement of a motion transmitting remote control assembly looking upwardly along the center axis of FIG. 1.
Figure 3:
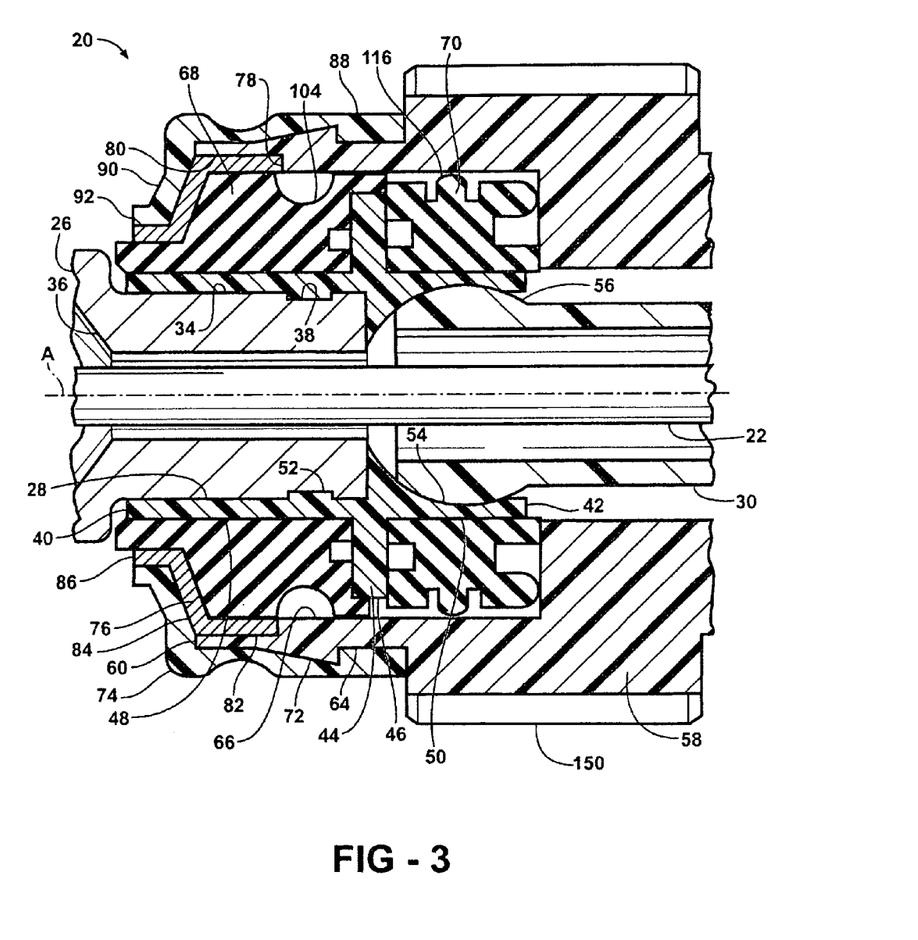
FIG. 3 is an enlarged fragmentary cross-sectional view of the central portion of FIG. 2.
Figure 4:
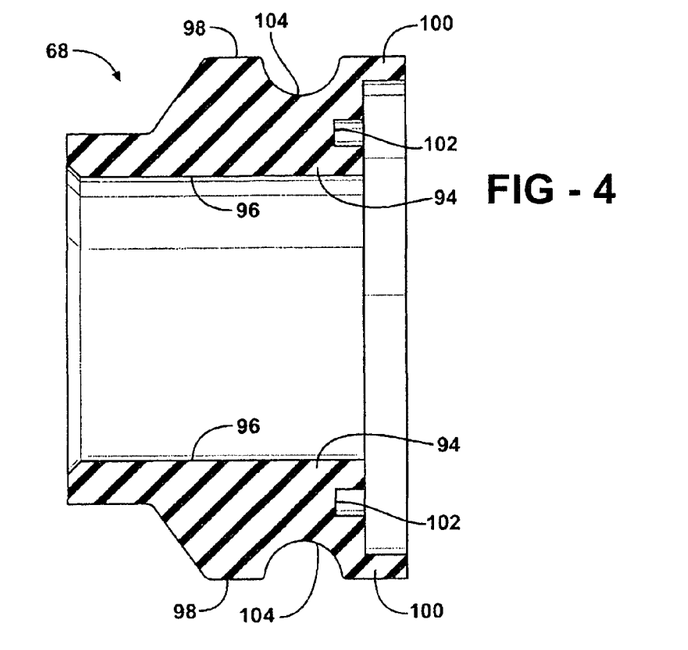
FIG. 4 is cross-sectional view of the configuration of the first annular isolator.
Figure 5:
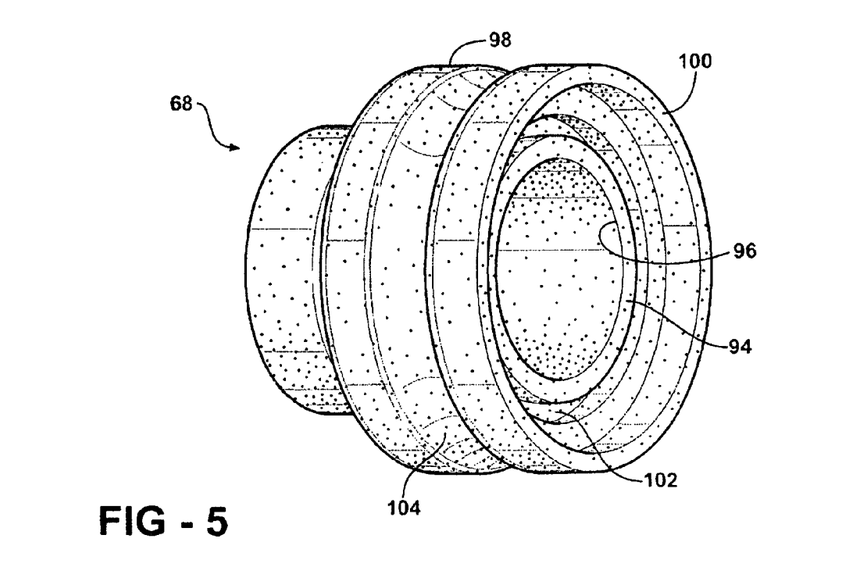
FIG. 5 is a perspective view of the configuration of the first isolator.

Referring to FIGS. 1 and 7, the assembly 20 is to be supported in a bracket 132 having a U-shaped slot 134. The U-shaped slot 134 is defined by parallel edges 136 and a bottom edge 138 extending along an arc and connecting the parallel edges 136. The bracket 132 includes a pair of notches 140 disposed about the parallel edges 136. The support body 58 defines a groove 142 extending in a U-shape and having a first leg 144 for abutting one of the parallel edges 136 of the U-shaped slot 134 and a second leg 146 for abutting another of the parallel edges 136 of the slot 134 and a bottom leg 148 extending along an arc between the first and second legs 144, 146 and having the same radius as the bottom edge 138 of the U-shaped slot 134 for abutting the bottom edge 138 of the U-shaped slot 134.

The support body 58 defines a pair of female guides 150 extending axially in opposite directions from the first and second legs 144, 146 of the groove 142. A pair of slider arms 152 extend axially through the first and second legs 144, 146 of the groove 142 from retainer ends 154 to distal ends 156 and are movably supported in the female guides 150. The slider arms 152 include a cross member 158 extending transversely between the retainer ends 154 and have a grip surface disposed thereon. The support body 58 includes a pair of snap-in retainers 160 for abutting the retainer ends 154 of the slider arms 152 for preventing the slider arms 152 from moving out of the female guides 150 to establish a locking position. A pair of biasing spring members 162 are disposed within the female guides 150 and abut the distal ends 156 of the slider arms 152 for exerting a biasing force on the distal ends 156 of the slider arms 152 to urge the slider arms 152 into the locking position. The slider arms 152 include a pair of locking tabs 164 projecting into the first and second legs 144, 146 of the groove 142 for engaging the notches 140 of the bracket 132 in the locking position and for moving axially relative to the support body 58 in response to an axial force on the grip surface to move the slider arms 152 axially against the axial biasing force of the biasing spring members 162 to move the locking tabs 164 to an insertion position.

The invention also includes a method of fabricating a motion transmitting remote control assembly 20 of the type for transmitting motion in a curved path by a flexible core element 22 supported in a conduit 24 with an end fitting 26, 28 isolated from a support body 58 by an annular isolator 68, 70.

The method comprises the steps of counterboring the open ended bore 66 to define a mechanical stop 78 extending radially outwardly from the bore 66. The method proceeds by disposing an annular isolator 68, 70 in the open ended bore 66 of the support body 58. For limiting compression of the isolator 68, 70, the method includes inserting an inflexible compression ring 76 into the open ended bore 66. This step includes disposing the inflexible compression ring 76 with a collar portion 82 in abutting engagement with the stop 78 and extending from the stop 78 axially along the counterbore 80 and a conical portion 84 extending conically from the collar portion 82 and a lip portion 86 extending axially from the conical portion 84 to engage the annular isolator 68, 70. The method proceeds by molding a cap 74 onto the support body 58 to close the open ended bore 66. The molding of the cap 74 includes molding the cap 74 with a tubular section 88 engaging the support body 58 and an end section 90 axially engaging the conical portion 84 and a neck portion engaging the lip portion 86 to limit compression of the isolator 68, 70 from the cap 74.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A motion transmitting remote control assembly (20) of the type for transmitting motion in a curved path by a flexible core element (22) supported in a conduit (24), said assembly (20) comprising;

an end fitting (26, 28) extending along an axis (A) for surrounding and supporting the conduit (24), a support body (58) extending along said axis (A) and presenting an open ended bore (66) surrounding and in radial spaced relationship to said end fitting (26, 28), an annular isolator (68, 70) disposed in said bore (66) engaging said end fitting (26, 28) and said support body (58) for attenuating vibrations therebetween, a cap (74) disposed on said support body (58) to close said open ended bore (66), and characterized by an inflexible compression ring (76) sandwiched and disposed in overlaying relationship between said isolator (68, 70) and said cap (74) and including an axially extending collar portion (82) and an axially extending lip portion (86) and a radially extending conical portion (84) extending conically between said collar and lip portion (82, 86) to prevent contact between said isolator (68, 70) and said cap (74) for limiting compression of said isolator (68, 70) from said cap (74);

said cap including an end section (90) axially engaging said radially extending portion (84) of said inflexible compression ring (76) and a neck section (92) radially engaging said lip portion (86) of said inflexible compression ring (76).

2. The assembly (20) as set forth in claim 1 wherein said support body (58) defines a mechanical stop (78) for limiting axial movement of said inflexible compression ring (76) to isolate compression of said isolator (68, 70) from said cap (74).

3. The assembly (20) as set forth in claim 2 including said bore (66) of said support body (58) being counterbored (80) to define said mechanical stop (78) extending radially outwardly from said bore (66), and said axially extending collar portion (82) disposed in abutting engagement with said stop (78) and extending from said stop (78) axially along said counterbore (80).

4. The assembly (20) as set forth in claim 3 wherein said cap (74) includes a tubular section (88) engaging said support body (58).

5. The assembly (20) as set forth in claim 4 wherein said end fitting (26) includes a coupling body (28) extending along said axis (A) between a first end (40) and a second end (42) and a flange (44) extending radially about said coupling body (28) to define a first pocket (48) on the first end (40) side of said flange (44) and a second pocket (50) on the second end (42) side of said flange (44), and said isolator (68, 70) includes a first annular isolator (68) disposed about said first pocket (48) and a second annular isolator (70) disposed about said second pocket (50).

6. The assembly (20) as set forth in claim 5 wherein each of said first and second annular isolator (68, 70) include a cylindrical portion (94, 106) extending axially between said flange (44) and said corresponding end of said coupling body (28) and present an inner surface (96, 108) engaging said first and second pocket (48, 50) and extend radially outwardly to present an outer surface (98, 110) engaging said bore (66) for isolating said coupling body (28) from direct contact with said support body (58) and attenuating vibrations therebetween.

7. The assembly (20) as set forth in claim 6 wherein said first and second isolator (68, 70) have different configurations for attenuating different ranges of vibrations.

8. The assembly (20) as set forth in claim 7 wherein said configuration of said first annular isolator (68) defines a first circumferential recess (104) extending radially into said first outer surface (98) for attenuating vibrations.

9. The assembly (20) as set forth in claim 8 wherein said configuration of said first annular isolator (68) includes a first annular projection (100) extending axially and sandwiched between said bore (66) of said support body (58) and said rim (46) of said flange (44) for isolating said coupling body (28) from direct contact with said support body (58), and defines a first annular groove (102) axially facing said first end (40) side of said flange (44) for attenuating vibrations.

10. The assembly (20) as set forth in claim 9 wherein said configuration of said second isolator (70) includes a web portion (112) projecting radially from said second cylindrical portion (106) and extending axially shorter than said second cylindrical portion (106) and a top portion (114) projecting radially from said web portion (112) to said second outer surface (110) and extending axially longer than said web portion (112) and compressed axially between said flange (44) and said support body (58) and a rib (116) projecting radially beyond said top portion (114) and contacting said bore (66) of said support body (58) for spacing said top portion (114) radially from said bore (66).

11. The assembly (20) as set forth in claim 10 wherein said configuration of said second isolator (70) defines a second annular groove (118) disposed radially between said top portion (114) and said second cylindrical portion (106) and axially facing said second end (42) side of said flange (44) and a third annular groove (120) disposed radially between said top portion (114) and said second cylindrical portion (106) and axially facing said support body (58) and a pair of annular recesses (122) extending radially into said second outer surface (110) and axially disposed on opposite sides of said rib (116) for attenuating vibrations.

12. The assembly (20) as set forth in claim 9 wherein said configuration of said second isolator (70) defines a second circumferential recess (126) extending radially into said second outer surface (110) for attenuating vibrations.

13. The assembly (20) as set forth in claim 12 wherein said configuration of said second annular isolator (70) includes a second annular projection (124) extending axially and sandwiched between said bore (66) of said support body (58) and said rim (46) of said flange (44) for isolating said coupling body (28) from direct contact with said support body (58), and defines a fourth annular groove (128) axially facing said second end (42) side of said flange (44) for attenuating vibrations.

14. A motion transmitting remote control assembly (20) comprising;
a flexible motion transmitting core element (22),
a conduit (24) extending along an axis (A) and movably supporting said core element (22),
an end fitting (26, 28) extending along said axis (A) for surrounding and supporting said conduit (24) and including an end connector (26) and a swivel coupling body (28) for supporting a swivel tube (30),
said end connector (26) extending along said axis (A) and having an elongated tubular portion (32) engaging said conduit (24) and having a narrow end portion (34) axially shorter than said elongated tubular portion (32) and having a narrower diameter than said elongated tubular portion (32) and having a shoulder (36) disposed axially between said elongated tubular portion (32) and said narrow end portion (34) and defining an annular channel (38) extending circumferentially about said narrow end portion (34),
said swivel coupling body (28) comprising a tubular shape extending along said axis (A) between a first end (40) and a second end (42) and a flange (44) extending radially about said swivel coupling body (28) to a rim (46) and spaced axially between said first and second ends (40, 42) to define a first pocket (48) on the first end (40) side of said flange (44) and a second pocket (50) on the second end (42) side of said flange (44),
said swivel coupling body (28) surrounding said end connector (26) between said first end (40) and said flange (44) and presenting a ridge (52) extending radially into said annular channel (38) of said narrow end portion (34) of said end connector (26) for securing said end connector (26) to said swivel coupling body (28),
said swivel coupling body (28) presenting a spherical pocket (54) between said second end (42) and said flange (44) for receiving said swivel tube (30),
said swivel tube (30) surrounding said core element (22) and having a spherical end (56) supported in said spherical pocket (54) for swiveling movement of said swivel tube (30) relative to said swivel coupling body (28),
a support body (58) extending along said axis (A) between a connecting end (60) and a swivel end (62) and presenting an outer axial surface (64) and an open ended bore (66) extending into said connecting end (60) and disposed radially inwardly from said outer axial surface (64) surrounding and in radial spaced relationship to said coupling body (28) and said rim (46), an annular isolator (68, 70) disposed in said bore (66) engaging said first and second pocket (48, 50) of said support body (58) and said bore (66) for attenuating vibrations therebetween, said annular isolator (68, 70) including a first annular isolator (68) disposed about said first pocket (48) and a second annular isolator (70) disposed about second pocket (50) and said first and second isolator (68, 70) having different configurations for attenuating different ranges of vibrations, said first annular isolator (68) including a first cylindrical portion (94) extending axially between said flange (44) and said first end (40) of said swivel coupling body (28) and presenting a first inner surface (96) engaging said first pocket (48) of said swivel coupling body (28) and extending radially outwardly to present a first outer surface (98) engaging said bore (66) for isolating said coupling body (28) from direct contact with said support body (58) and attenuating vibrations therebetween, said second annular isolator (70) including a second cylindrical portion (106) extending axially between said flange (44) and said second end (42) of said swivel coupling body (28) and presenting a second inner surface (108) engaging said second pocket (50) of said swivel coupling body (28) and extending radially outwardly to present a second outer surface (110) engaging said bore (66) for isolating said coupling body (28) from direct contact with said support body (58) and attenuating vibrations therebetween, said first isolator (68) defining a first annular groove (102) axially facing said first end (40) side of said flange (44), said first isolator (68) including a first annular projection (100) extending axially and sandwiched between said bore (66) and said rim (46) of said flange (44) for isolating said coupling body (28) from direct contact with said support body (58), said first isolator (68) including a first circumferential recess (104) extending radially into said first outer surface (98) and disposed axially between said connector end of said support body (58) and said flange (44) for attenuating vibrations, said second isolator (70) including a web portion (112) projecting radially from said second cylindrical portion (106) and extending axially shorter than said second cylindrical portion (106), said second isolator (70) including a top portion (114) projecting radially from said web portion (112) to said second outer surface (110) and extending axially longer than said web portion (112) and compressed axially between said flange (44) and said support body (58), said second outer surface (110) of said second isolator (70) including a rib (116) projecting radially beyond said top portion (114) and contacting said bore (66) of said support body (58) for spacing said top portion (114) radially from said bore (66), said second isolator (70) defining a second annular groove (118) disposed radially between said top portion (114) and said second cylindrical portion (106) and axially facing said second end (42) side of said flange (44), said second isolator (70) defining a third annular groove (120) disposed radially between said top portion (114) and said second cylindrical portion (106) and axially facing said swivel end (62) of said support body (58), said second isolator (70) including a pair of annular recesses (122) extending radially into said second outer surface (110) and axially disposed on opposite sides of said rib (116), a plurality of tabs (72) extending radially outwardly from said outer axial surface (64) of said connecting end (60) of said support body (58), a cap (74) disposed in mechanical interlocking engagement with said tabs (72) on said connecting end (60) of said support body (58) to close said open ended bore (66), said support body (58) surrounding said swivel tube (30) adjacent said swivel end (62) and including a frustoconical inner wall (130) extending axially into said support body (58) from said swivel end (62), a bracket (132) having a U-shaped slot (134) defined by parallel edges (136) and a bottom edge (138) extending along an arc connecting the parallel edges (136) and a pair of notches (140) disposed about said parallel edges (136), said support body (58) defining a groove (142) extending in a U-shape having a first leg (144) for abutting one of said parallel edges (136) of said U-shaped slot (134) and a second leg (146) for abutting another of said parallel edges (136) of said slot (134) and a bottom leg (148) extending along an arc between said first and second leg (144, 146) having the same radius as said bottom edge (138) of said U-shaped slot (134) for abutting said bottom edge (138) of said U-shaped slot (134), said support body (58) defining a pair of female guides (150) extending axially in opposite directions from said first and second leg (144, 146) of said groove (142), a pair of slider arms (152) extending axially through said first and second leg (144, 146) of said groove (142) from retainer ends (154) to distal ends (156) and movably supported in said female guides (150), said slider arms (152) including a cross member (158) extending transversely between said retainer ends (154) and having a grip surface disposed thereon, said support body (58) including a pair of snap-in retainers (160) for abutting said retainer ends (154) of said slider arms (152) for preventing said slider arms (152) from moving out of said female guides (150) to establish a locking position, a pair of biasing spring members (162) disposed within said female guides (150) and abutting said distal ends (156) of said slider arms (152) for exerting a biasing force on said distal ends (156) of said slider arms (152) to urge said slider arms (152) into said locking position, said slider arms (152) including a pair of locking tabs (164) projecting into said first and second leg (144, 146) of said groove (142) for engaging said notches (140) of said bracket (132) in said locking position and for moving axially relative to said support body (58) in response to an axial force on said grip surface to move said slider arms (152) axially against the axial biasing force of said biasing spring members (162) to move said locking tabs (164) to an insertion position, and characterized by an inflexible compression ring (76) sandwiched axially between said isolator (68, 70) and said cap (74) to limit compression of said isolator from said cap (74), said bore (66) in said connecting end (60) of said support body (58) being counterbored (80) to define a mechanical stop (78) extending radially outwardly from said bore (66) for limiting axial movement of said compression ring (76) to isolate compression of said isolator (68, 70) from said cap (74), said inflexible compression ring (76) sandwiched axially between said first isolator (68) and said counterbore (80) and including an axially extending collar portion (82) in abutting engagement with said stop (78) and extending from said stop (78) axially along said counterbore (80)

and a conical portion (84) extending conically from said collar portion (82) and engaging said first isolator (68) and a lip portion (86) extending axially from said conical portion (84) and engaging said first cylindrical portion (94) of said first isolator (68) to limit compression of said first isolator (68), and said cap (74) including a tubular section (88) engaging said tabs (72) and an end section (90) axially engaging said conical portion (84) and a neck section (92) engaging said lip portion (86) of said compression ring (76) for axially engaging said compression ring (76) to limit compression of said isolator (68, 70) from said cap (74).

* * * * *